(12) United States Patent
Mannonen et al.

(10) Patent No.: US 12,398,541 B2
(45) Date of Patent: Aug. 26, 2025

(54) MINE OPERATIONS ANALYSIS AND CONTROL

(71) Applicant: SANDVIK MINING AND CONSTRUCTION OY, Tampere (FI)

(72) Inventors: Petri Mannonen, Tampere (FI); Pekka Martikainen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 1006 days.

(21) Appl. No.: 17/418,199

(22) PCT Filed: Dec. 20, 2019

(86) PCT No.: PCT/EP2019/086712
§ 371 (c)(1),
(2) Date: Jun. 24, 2021

(87) PCT Pub. No.: WO2020/136121
PCT Pub. Date: Jul. 2, 2020

(65) Prior Publication Data
US 2022/0106772 A1    Apr. 7, 2022

(30) Foreign Application Priority Data
Dec. 28, 2018   (EP) .................................... 18248248

(51) Int. Cl.
*E02F 9/26*   (2006.01)
*E02F 9/20*   (2006.01)
*G06Q 10/00*  (2023.01)

(52) U.S. Cl.
CPC ............ *E02F 9/262* (2013.01); *E02F 9/2045* (2013.01); *E02F 9/2054* (2013.01); *E02F 9/265* (2013.01)

(58) Field of Classification Search
CPC ....... E02F 9/262; E02F 9/2045; E02F 9/2054; E02F 9/265; G06Q 10/00
USPC ........................................................... 700/83
See application file for complete search history.

(56) References Cited

U.S. PATENT DOCUMENTS

| | | |
|---|---|---|
| 2006/0047377 A1 | 3/2006 | Ferguson et al. |
| 2008/0137589 A1* | 6/2008 | Barrett .................... H04W 4/33 370/327 |
| 2011/0153117 A1 | 6/2011 | Koch et al. |

(Continued)

FOREIGN PATENT DOCUMENTS

| | | |
|---|---|---|
| CN | 102562162 A | 7/2012 |
| CN | 203705666 U | 7/2014 |

(Continued)

*Primary Examiner* — Michael J Brown
(74) *Attorney, Agent, or Firm* — Corinne R. Gorski

(57) ABSTRACT

A method including the steps of receiving mine operations data from a set of data sources in a mine, processing the mine operations data to detect a set of events meeting at least one operator attention triggering condition, mapping the set of events to a mine model on the basis of location information associated with the events in the set of events, determining an affected location area of the set of events mapped to the mine model, and generating an operator attention indicator dependent on density of events in the affected location area for display for the set of events in the affected location area in the mine model to an operator to adjust operation of one or more mine operations devices.

15 Claims, 7 Drawing Sheets

(56) References Cited

U.S. PATENT DOCUMENTS

2014/0240875 A1* 8/2014 Qian .................... H02H 1/0092
361/42

FOREIGN PATENT DOCUMENTS

EP        3385500 A1    10/2018
GB        2558255  A     7/2018

* cited by examiner

MINE OPERATIONS ANALYSIS AND CONTROL

RELATED APPLICATION DATA

This application is a § 371 National Stage Application of PCT International Application No. PCT/EP2019/086712 filed Dec. 20, 2019 claiming priority to EP 1824248.9 filed Dec. 28, 2018.

FIELD

The present invention relates to analysing, monitoring and controlling of mine operations.

BACKGROUND

Mines, such as hard rock or soft rock mines, typically comprise a variety of operation zones intended to be accessed by different types of mobile work machines, such as load and/or haul machines and drilling rigs. A mobile work machine may be an unmanned, e.g. remotely controlled from a control room, or a manned work machine, i.e. operated by an operator sitting in a cabin of the work machine. Mobile work machines may be autonomously operating, i.e. automated or semi-automated work machines, which in their normal operating mode operate independently without external control but which may be taken under external control at certain operation areas or conditions, such as during states of emergencies.

A mine may comprise large number of mobile and fixed sensors continuously collecting data related to or affecting operations in the mine operations. Such data may be referred to as mining operations data and comprise work machine operations status data (e.g. speed, motor parameter, load, etc.) and/or tunnel environment data (e.g. temperature, air condition etc.), for example. The data may be transferred to a data processing system, which may be configured to provide a mine operations control system, comprising a user interface for a user of the system, which may be referred to as an operator. Mines may be very large and complex with a large number of simultaneously operating mobile work machines. Very large amount of information may need to be provided in the user interface simultaneously, particularly in problem situations.

SUMMARY

The invention is defined by the features of the independent claims. Some specific embodiments are defined in the dependent claims.

According to a first aspect of the present invention, there is provided an apparatus, comprising means configured for performing: receiving mine operations data from a set of data sources in a mine, the mine operations data comprising sensor data, processing the mine operations data to detect a set of events meeting at least one operator attention triggering condition, mapping the set of events to a mine model on the basis of location information associated with the events in the set of events, determining an affected location area of the set of events mapped to the mine model, generating, on the basis of the set of events and the affected location area, an operator attention indicator dependent on density of events in the affected location area, and controlling display of the operator attention indicator for the set of events in the affected location area in the mine model to an operator to adjust operation of one or more mine operations devices.

According to a second aspect of the present invention, there is provided a method for facilitating mine operations analysis and control, comprising: receiving mine operations data from a set of data sources in a mine, the mine operations data comprising sensor data, processing the mine operations data to detect a set of events meeting at least one operator attention triggering condition, mapping the set of events to a mine model on the basis of location information associated with the events in the set of events, determining an affected location area of the set of events mapped to the mine model, generating, on the basis of the set of events and the affected location area, an operator attention indicator dependent on density of events in the affected location area, and controlling display of the operator attention indicator for the set of events in the affected location area in the mine model to an operator to adjust operation of one or more mine operations devices. Embodiments of the method include various embodiments of the apparatus of the first aspect.

According to a third aspect, there is provided an apparatus comprising at least one processing core, at least one memory including computer program code, the at least one memory and the computer program code being configured to, with the at least one processing core, cause the apparatus at least for performing: receiving mine operations data from a set of data sources in a mine, the mine operations data comprising sensor data, processing the mine operations data to detect a set of events meeting at least one operator attention triggering condition, mapping the set of events to a mine model on the basis of location information associated with the events in the set of events, determining an affected location area of the set of events mapped to the mine model, generating, on the basis of the set of events and the affected location area, an operator attention indicator dependent on density of events in the affected location area, and controlling display of the operator attention indicator for the set of events in the affected location area in the mine model to an operator to adjust operation of one or more mine operations devices.

According to a fourth aspect, there is provided a computer program, a computer program product or computer-readable medium comprising computer program code for, when executed in a data processing apparatus, to cause the apparatus to perform the method or an embodiment thereof.

An embodiment of any of the aspects further comprises processing at least some events in the set of events by a corrective action module to detect at least one corrective action to address at least some of events in the set of events, determining one or more mine operations devices and one or more control commands associated with the corrective action, and causing transmission of control signals associated with the one or more control commands to the determined one or more mine operations devices in response to detecting an imperative condition for automatic control, or generating an operator guidance element indicative of the determined one or more mine operations devices and the one or more control commands.

According to an embodiment of any of the aspects, coloring in the affected location area is controlled on the basis of the density of the set of data events and/or a set of parameter values of the set of events in the affected location area.

An embodiment of any of the aspects further comprises determining heat values for a tunnel point for each event in the set of events within the second radius from the tunnel point, determining a heat sum for the tunnel point by summing the heat values, defining color for the tunnel point on the basis of the heat sum, and controlling coloring of the tunnel point by the defined color in the three-dimensional representation.

According to an embodiment of any of the aspects, the affected location area is dependent on the number of events in the set of events.

An embodiment of any of the aspects further comprises receiving an indication of operator-selected time instant or time range and processing time stamps of the event data to detect the set of events matching with the operator-selected time instant or time range.

An embodiment of any of the aspects further comprises defining a parameter value of a data source or a set of data sources, and assigning a colour associated with a range of values comprising the parameter value for visualization of the data source or the set of data sources data.

An embodiment of any of the aspects further comprises defining number of events and/or data sources within the affected area or a sub-area of the affected area, and adapting brightness of visualization of the area on the basis of the number of events and/or data sources.

According to an embodiment, the apparatus is a server or part of a control system configured to visualize the at least one monitored feature on at least one display device.

EMBODIMENTS

Figure 1:
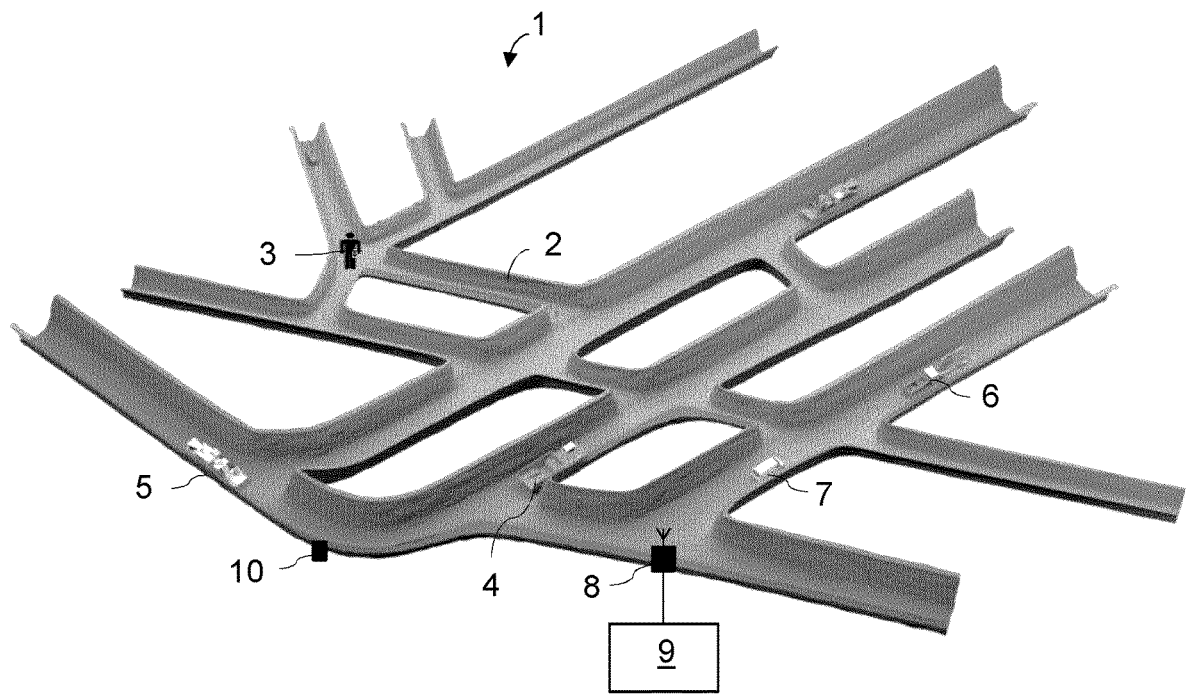
FIG. 1 illustrates an example of an example of an underground mine.

FIG. 1 illustrates a simplified example of a mine 1, in the present example an underground mine comprising a network 2 of underground tunnels. A plurality of mobile objects, such as persons or pedestrians 3 and/or mobile work machines 4, 5, 6, 7 may be present in and move between different areas or operation zones of the worksite 1.

The term mine herein is intended to include a variety of underground or surface excavation worksites. The term mobile work machine herein refers generally to mobile work machines suitable to be used in mine operations, such as lorries, dumpers, vans, mobile rock drilling or cutting rigs, mobile reinforcement machines, and bucket loaders. The mobile work machines may be autonomously operating mobile work machines, which herein refers to automated or semi-automated mobile work machines.

The worksite 1 comprises a communications system, such as a wireless access system comprising a wireless local area network (WLAN), comprising a plurality of wireless access nodes 8. The access nodes 8 may communicate with wireless communications units comprised by the work machines or carried by the pedestrians and with further communications devices (not shown), such as network device(s) configured to facilitate communications with an on-site (underground or above-ground) and/or remote control system 9.

The worksite 1 may further comprise various other types of mine operations devices 10 connectable to the control system 9 e.g. via the access node 8, not further illustrated in FIG. 1. Examples of such further mine operations devices 10 include various devices for power supply, ventilation, air condition analysis, safety, communications, and other automation devices. For example, the worksite may comprise a passage control system comprising passage control units (PCU) separating operation zones, some of which may be set-up for autonomously operating work machines. The passage control system and associated PCUs may be configured to allow or prevent movement of one or more work machines and/or pedestrians between zones.

Figure 2:
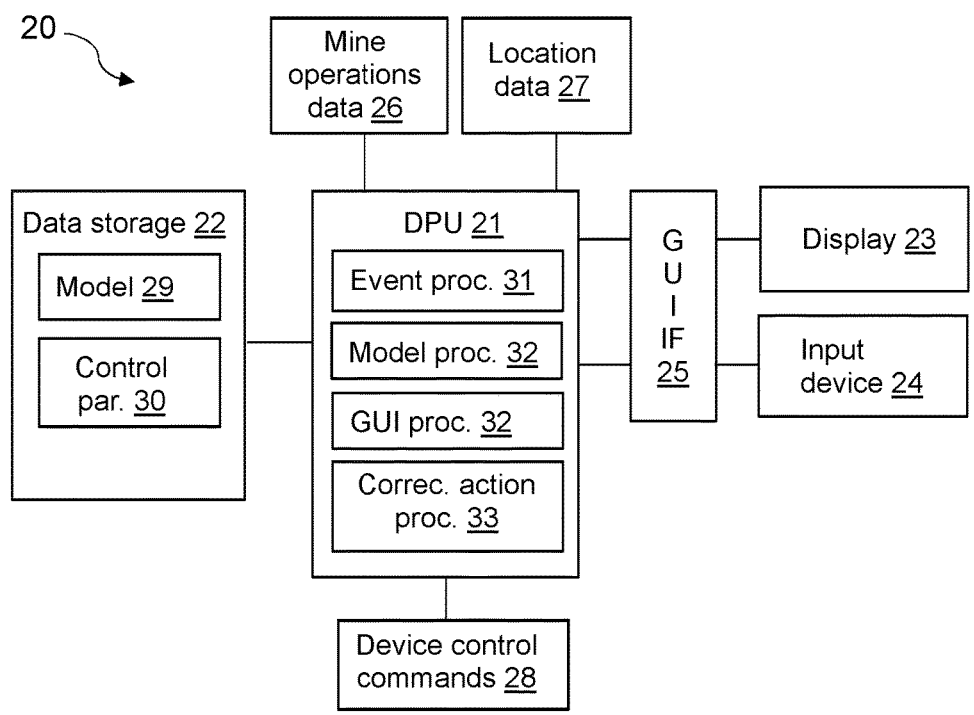
FIG. 2 illustrates a mine operations analytics and monitoring system according to at least some embodiments.

FIG. 2 illustrates a block diagram of some logical components of a mine operations analytics and monitoring system or apparatus 20 according to an example. A data processing unit (DPU) 21 receives mine operations data 26 from a set of data sources in a mine, such as the mobile objects 3-7 or other types of mine operations devices 10 illustrated in FIG. 1. The mine operations data may comprise sensor data, but it is to be appreciated that the mine operations data may comprise various other type of data, such as operating parameter data. The mine operations data may be indicative of mine operations performance, work machine parameters, performance and/or analytics data, for example. The mine operations data may comprise alarm data of one or more of a connectivity alarm, a safety device alarm, a vehicle alarm. For example, the data source is a sensor, a set of sensors, or a control unit or system configured to receive inputs from a set of sensors comprised by an underground vehicle.

The DPU 21 also receives location data 27 from at least some of the data sources. It is to be noted that the location data 27 may be in some embodiments received together with the associated mine operations data 26. In another embodiment, the DPU 21 or a positioning module (not shown) connected to the DPU 21 determines the locations of the data sources on the basis of identification data and/or positioning data from the respective data source.

The DPU 21 may also be configured to receive the mine model 29 and control parameters 30 stored in a data storage 22, such as one or more internal or external memories or databases. The control parameters may control at least some operations of the DPU 21 illustrated below, and comprise threshold values and other parameter values, for example. The DPU 21 may be configured to perform an event processing module 31, which may generate and/or detect events on the basis of the mine operations data 26, and further process the events as illustrated in some embodiments further below. A model processing module 32 may process the mine model 29 and map events and/or mobile objects to the model on the basis of location data associated with respective events and mobile objects. A GUI processing module 32 may generate or at least control GUI displayed to an operator by a display 23 via a GUI interface 25. The DPU 21 may further receive operator input from an input device 24 via the GUI IF 25.

The DPU 21 may further comprise a corrective action processing module (CAPM) 33 configured to define corrective action(s) on the basis of the events. The DPM 21 may comprise control command functionality for generating and/ or causing control commands 28 to mine operations devices 4-8, 10, which may be a specific module or part of the CAPM 33. It will be appreciated that the system or apparatus 20 may comprise various further units or devices not illustrated in FIG. 2, such as one or more communications device to transmit and receive the data 26, 27 and commands 28.

Figure 3:
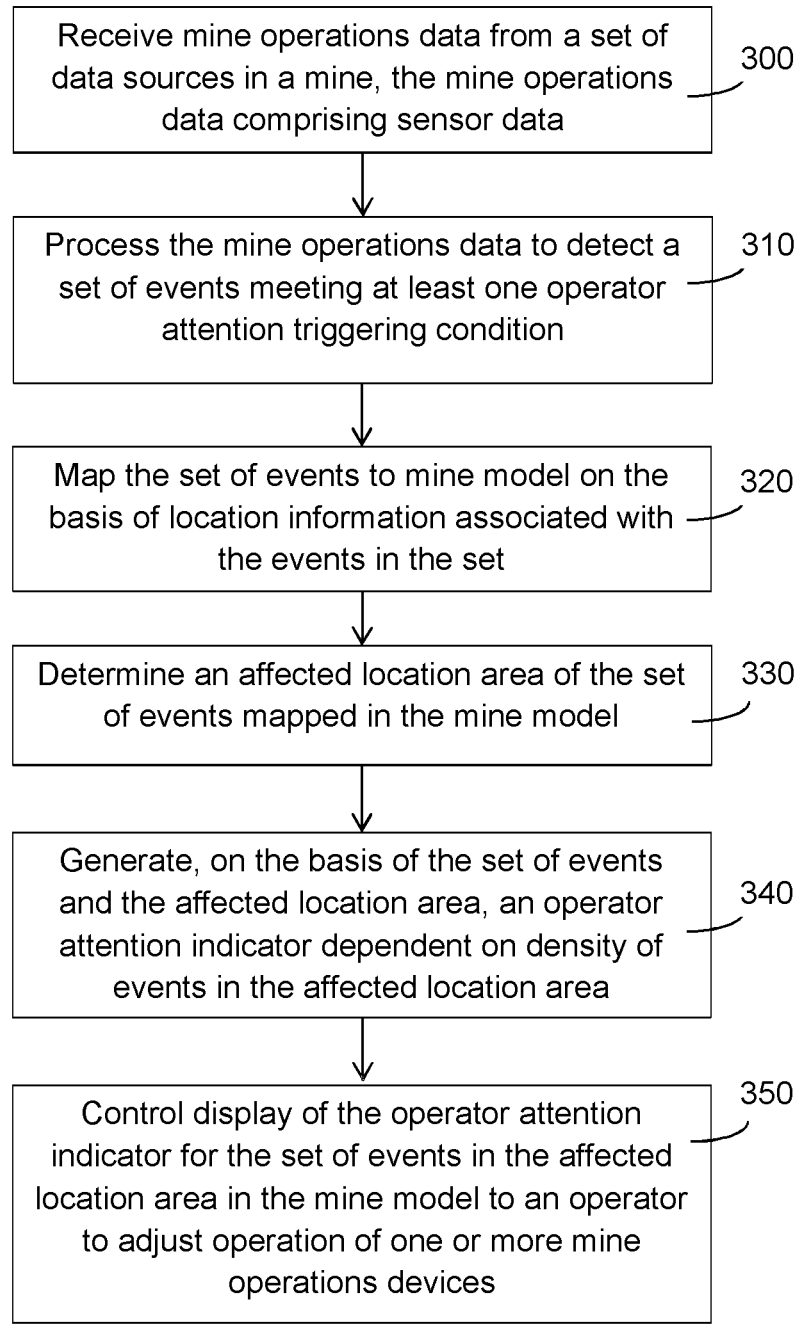
FIGS. 3 to 5 illustrate methods according to at least some embodiments.

FIG. 3 illustrates a method according to some embodiments. The method may be carried out in a mine control system, such as by the DPU 21, and by at least one processing unit therefor.

The method comprises receiving 300 mine operations data from a set of data sources in a mine, the mine operations data comprising sensor data. In some embodiments, the mine operations data comprises sensor data from mobile work machines. The mine operations data is processed 310 to detect a set of events meeting at least one operator attention triggering condition. For example, there may be a set of threshold values for associated mine operation data and/or event data types for triggering operation attention. Mine operations data or resulting events comprising value(s) meeting at least one of these threshold values causes an event to be generated or selected for the set. These values may be modified and filtered automatically or based on user input, e.g. to enable the operator to switch between different event and alert attention views.

The set of events is mapped 320 to a mine model, on the basis of location information associated with each of the events in the set of events. The events may thus be positioned in the model on the basis of associated 2D or 3D coordinates.

An affected location area of the set of events mapped to the mine model is determined 330. For example, block 330 may comprise determining an affected event location area for each event in the set, and the affected event location areas define or are used to define the affected location area of the set. For example, the affected location area in the mine and mine model may be defined on the basis of predetermined radius around an event. The size of the affected location are may differ e.g. on the basis of identifier and/or severity class of the event.

On the basis of the set of events and the affected location area, an operator attention indicator dependent on density of events in the affected location area is generated 340. Depending on applied embodiment, this may refer to completely creating the operator attention indicator or selecting the operator attention indicator from a set of available indicators, on the basis of the density of the events. Display of the operator attention indicator is controlled 350 for the set of events in the affected location area in the mine model to an operator to adjust operation of one or more mine operations devices. The operator attention indicator may also be referred to as an event density indicator.

In response to receiving control input(s) from the operator after block 350, control commands are transmitted to one or more mine operations devices to address the event, e.g. to overcome an alert or underperformance issue. In some embodiments, the DPU 21 and a module thereof, such as the CAPM 33, is configured to receive the user input from the input device 24 and the GUI IF 25, and generate the control commands 28 to associated mine operations device(s) 4-8, 10. After the control commands are executed in the associated mine operations device(s), new mine operations data 26 is received by the DPU 21 and the method of FIG. 3 may be repeated. Then, an updated mining operations status view is displayed to the operator. The earlier displayed operator attention indicator is updated according to the new mine operations data 26, and may be even removed if there are no longer operator attention triggering events.

Thus, the operator can instantly recognize if his corrective actions were enough and provide further control inputs, if appropriate. The presently disclosed features assist the operator to control mine operations devices in mine areas, which may be very complex and extensive. The operator can quickly detect main problematic production areas from less problematic ones and prioritize actions. The present features also enable to improved assistance to the operator to detect existing or prospective bottlenecks and provide instant reactive or proactive action control inputs.

In addition to visualizing operator-attention requiring event clusters based on respective event densities, there are various further actions that may be invoked to assist in the mine operations control on the basis of processing the mine operations data and event density. Some further embodiments are illustrated below, which may be carried out in connection with FIG. 3, e.g. after block 330, 340, or 350. The DPU 21 may be configured to perform at least some of the further features below, and there may be one or more further modules in the DPU for such features.

In some embodiments, at least some events in the set of events are processed to define at least one operator guidance element associated with at least some of the events in the set, to adjust the operation of one or more mine operations devices (associated with the event(s)). The operator guidance element(s) are then displayed for the affected location area. In an embodiment, the associated operator guidance element is displayed in response to detecting a user input for the affected location area, the mine operations device(s) or at least one event associated with the mine operations device(s).

Figure 4:
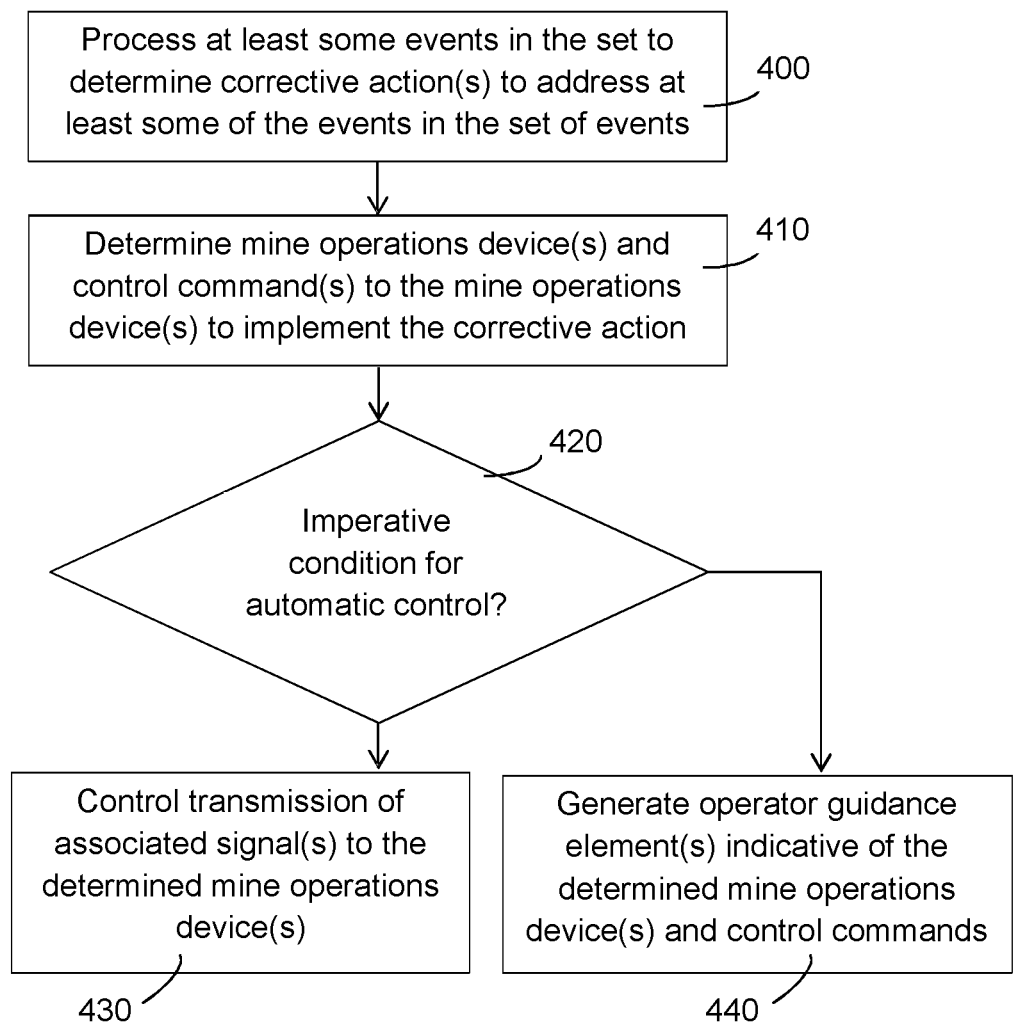

With reference to the method of FIG. 4, in some embodiments, at least some events in the set of events are processed 400, e.g. by the CAPM 33, to detect at least one corrective action for mine device operations to address the situation caused by the set of events detected in block 310. This may comprise defining control actions for one or more work machines 4-6 and/or other mine operations devices 10, for example. One or more mine operations devices and one or more control commands associated with the corrective action are determined 410. Control information for mapping event cause information with one or more operator guidance element and/or the corrective action may be stored in the data storage 22. The control signal and/or contents of the operator guidance element may thus be generated or selected on the basis of the control information. For example, control command(s), guidance information record(s), or data element(s) matching with the mine operations device type and alert identifier or further event charactering information are selected.

Control signal(s) associated with the determined control command(s) and the mine operations device(s) are transmitted 430, in response to detecting on the basis of processing in block 420 at least some events in the set of events that an imperative condition for automatic control is met. Alternatively, the corrective action(s), and the associated mine operations device(s) and control command(s) may be indicated for the operator, in some embodiments by generating 440 an operator guidance element. In an embodiment, the operator is provided with an input option, via which the operator may directly trigger the transmission of the determined control signal(s).

In an example, the system may be configured to monitor bucket weight of load and haul devices (LHD) in the mine. If the average bucket weight in the mine (or of a give LHD device) is 10, and bucket weight of LHD devices filling their bucket at given loading area is around 6, below a threshold of 7 (or 30% less than average), for example, events are generated for these LHD devices and the associated loading area. User guidance information element(s) may be displayed for the operator to take action to manually control the bucket loading or adapt automatic loading control parameters for the LHD devices, or control command(s) adapting automatic loading control parameters may be defined and sent to the LHD devices.

In some embodiments, at least some events in the set of events are processed to determine if at least one area alarm condition is met. In response to detecting that the at least one area alarm condition is met, the area alarm and/or a safety control action associated with at least the affected area is controlled. For example, automatic drive operations may thus be interrupted at an operation zone comprising the affected area.

Figure 5:
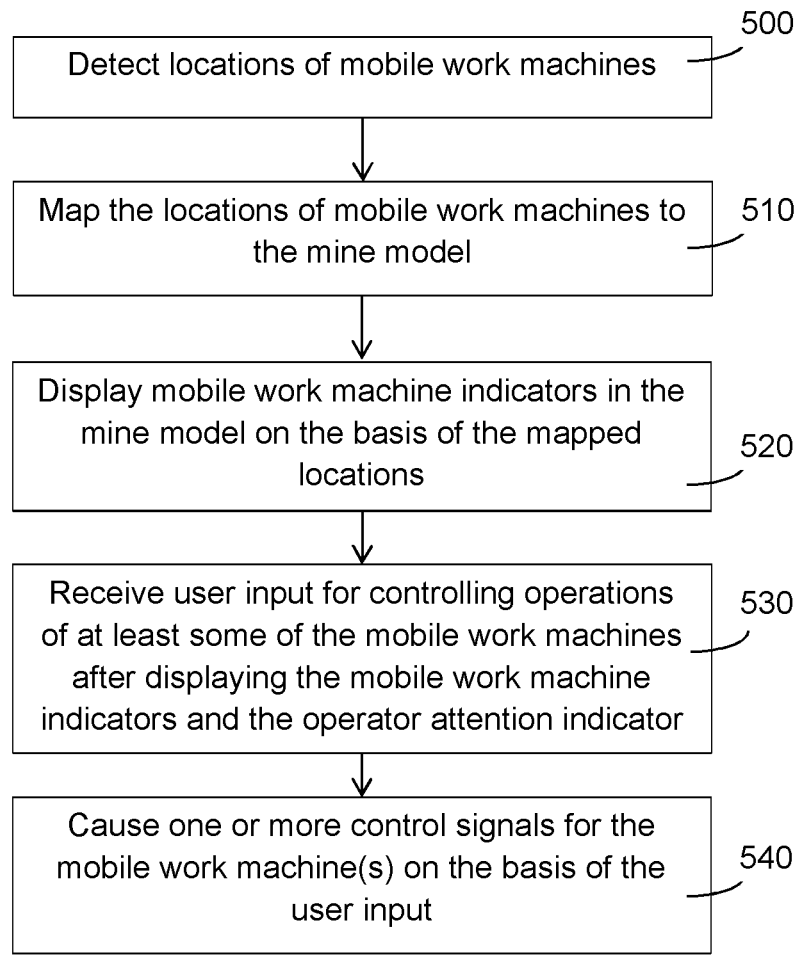

The control system, such as the DPU 21, may be further configured for perform the method of FIG. 5. Locations of mobile work machines are detected 500, e.g. based on the received location data 27. Block 500 may be performed for some or all of the work machines 4-6 in the mine 1. The locations of the mobile work machines are mapped 510 to the mine model. Mobile work machine indicators are displayed 520 in the mine model on the basis of the mapped locations.

User input is received 530 for controlling operations of at least some of the mobile work machines after displaying the mobile work machine indicators and the operator attention indicator. Control signals are caused 540 to the mobile work machine(s) on the basis of the user input.

Event(s) of the set detected in block 310 may be mapped to a location of a mobile work machine on the basis of work machine identification information received with the mine operations data associated with the event(s).

In some embodiments, one or more visualization parameters are defined for the operator attention indicator in the affected location area on the basis of density of the set of data events and/or a set of parameter values of the set of events in the affected location area. Display of the operator attention indicator is controlled on the basis of the defined at least one visualization parameter in a production status display based on the mine model.

In some embodiments, coloring in the affected location area is controlled on the basis of density of the set of data events and/or a set of parameter values of the set of events in the affected location area. One or more parameter values of at least one event detected to require operator attention are used as an input parameter set affecting the generation 340 of the operator attention indicator. According to a method according to some embodiments, a parameter value of a data source or a set of data sources is defined. A colour associated with a range of values comprising the parameter value is defined for visualization of the data source or the set of data sources data.

In some embodiments, one or more further visualization parameters are defined on the basis of parameter values and/or detected number of events and/or data sources within the affected area or a sub-area of the affected area. In an embodiment, brightness of visualization of the operator attention indicator and/or the affected area is adapted on the basis of the number of events and/or data sources.

In an example embodiments, coloring is controlled with a first magnitude value within a first radius from a location of an event in the set of events and with a second magnitude within a second radius from the location of the event, wherein the second radius is larger than the first radius and the first magnitude value is larger than the second magnitude value. In an embodiment, the first radius defines size of an associated data source. Inside this radius the color or heat may be applied with full magnitude, and the first radius may also be considered as full magnitude radius or distance. The second radius may define the affected zone of the data source. Outside the second radius, which may also be referred to as falloff distance, the data point has no effect to the mine model. Thus, the operator attention indicator may be generated such that no coloring is applied for indicating operator attention in the affected location area outside the second radius. The affected location area may be dependent on the number of events in the set of events. For example, the first and/or second radius is increased with increase of the events.

Each data source may be defined and described as a heat or a light source, which has at least two radius values. For example, the first radius may be in the range of 2 to 15 meters, such as 10 meters, and the second radius in the range of 10 to 30 meters, such as 15 meters. It will be appreciated that also further distances may be applied to control the generation of the operator attention indicator, e.g. one or more intermediate distances between the first radius and the second radius.

In some embodiments, the mine model comprises three-dimensional (3D) point cloud data for three-dimensional representation of an underground mine, and the operator attention indicator covers at least a portion of 3D representation of tunnel portion associated with the affected area. However, it is to be appreciated that alternatively two-dimensional model may be applied.

In an example embodiment, the operator attention indicator is generated for 3D tunnel representation by a method comprising:
  determining heat values for a tunnel point for each event in the set of events within the second radius from the tunnel point,
  determining a heat sum for the tunnel point by summing the heat values,
  defining color for the tunnel point on the basis of the heat sum, and
  controlling coloring of the tunnel point by the defined color in the three-dimensional representation.

Figure 6:
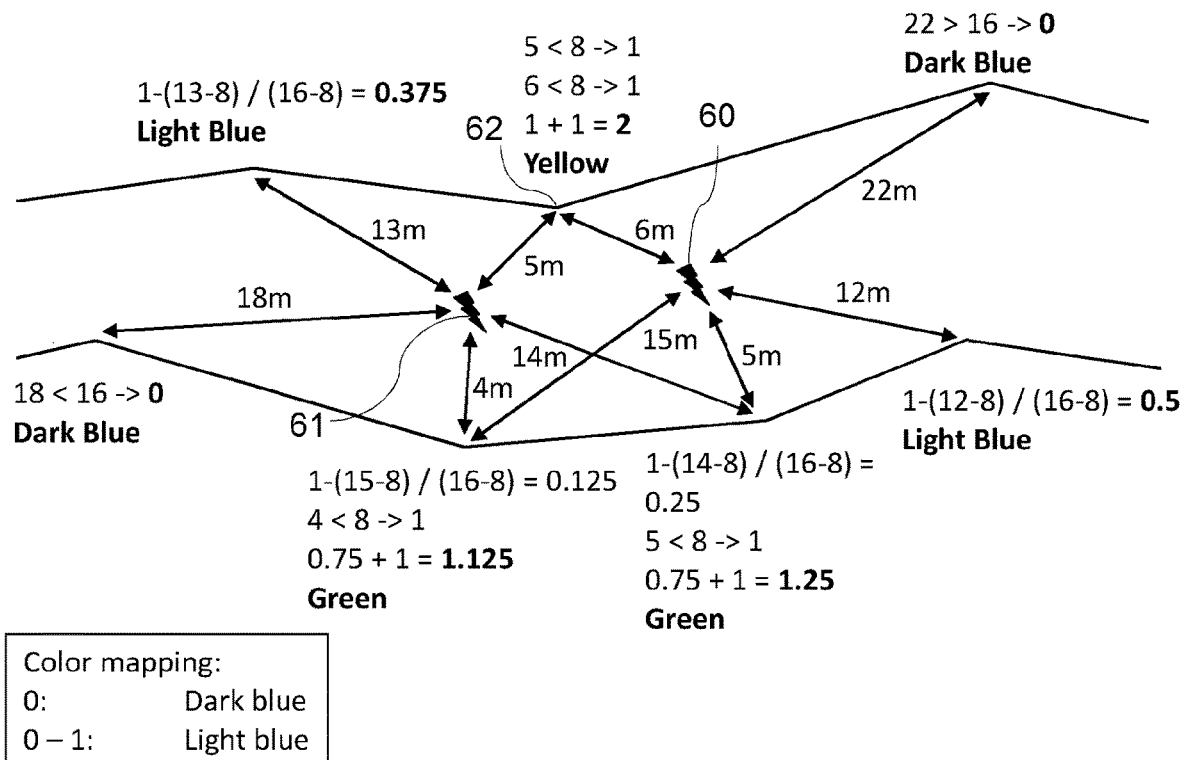
FIG. 6 illustrates simplified example of density-based definition of display parameters.

In the simplified example illustrated in FIG. 6, two events 60, 61 have occurred inside a tunnel. Distances of the events 60, 61 to nearby tunnel points (at other end points of the arrows) 62 are calculated. If the distance is greater than the selected falloff value, 16 meters in this example, they do not affect the tunnel point heat. If the distance is shorter than the selected full magnitude distance, which is 8 meters in this example, the added heat to the tunnel point is one unit. For example, tunnel point 62 is closer than 8 meters to both events, so it is assigned 1+1=2, which is mapped to yellow. Distances between the full magnitude and the falloff distance may add 0–1 units of heat using a formula:

$$\text{Heat}=(\text{Distance}-m)/(f-m)$$

m refers to full magnitude distance and f to falloff distance.

If the model has surfaces, they are colored according to the defined color. In a wireframe model the vertices are colored. In point cloud model individual points are colored.

In an embodiment, the color definition is based on a monochromatic coloring model. The color range is the same or a subset of rainbow colors from violet to red. This model may be used when the data values of the events are not of importance, but the density of events is illustrated, for example alarm locations or areas where the signal values have exceeded a given operator attention triggering threshold value. Areas with no events may have a default color, such as dark grey. Areas with low density of events may be defined as violet or blue, and the areas with high density of events may be defined as red, for example. Various rainbow colors including cyan, green, yellow and orange may be used to describe different mid-level densities.

In some embodiments, the color definition is based on Red Green Blue (RGB) coloring model. This model may be particularly useful when the density of the events is not relevant, but the event data values are more important. In this model each event or data point may be configured to emit light of fixed luminosity, which colors the surrounding mine model. The light can be either monochromatic or any color from the RGB color space. Compared to heatmap coloring, RGB color mode can be applied to visualize the variance and balance of data values of the events. RGB color mode also allows an efficient way to filter events based on the values. Each color channel (red, green and blue) can be defined to include only values from a certain value range. For example, by disabling blue and green color channels the visualization can show the affected areas of high values (red channel) only. In an embodiment, the filtering is controlled in response to user input, for example to further quickly detect where events of particular type occur. The filtering may be controlled based on some other trigger. For example, the may automatically switch to display between different filtered event views.

In an embodiment, the color definition is based on RGB model with variable brightness, wherein there is an addition brightness calculation to describe the density of events. The model combines the density visualization with the value information visualization. Areas of high density may be assigned with bright colors and areas with low density may be assigned with darker colors, while the hue of the color is affected by the data values only.

It will be appreciated that in addition or instead of the above examples, also other visualization parameters may be adapted on the basis of density and/or parameter values of the data events in the affected location areas. For example, reflection or transparency and/or glow maybe controlled.

Figure 7A:
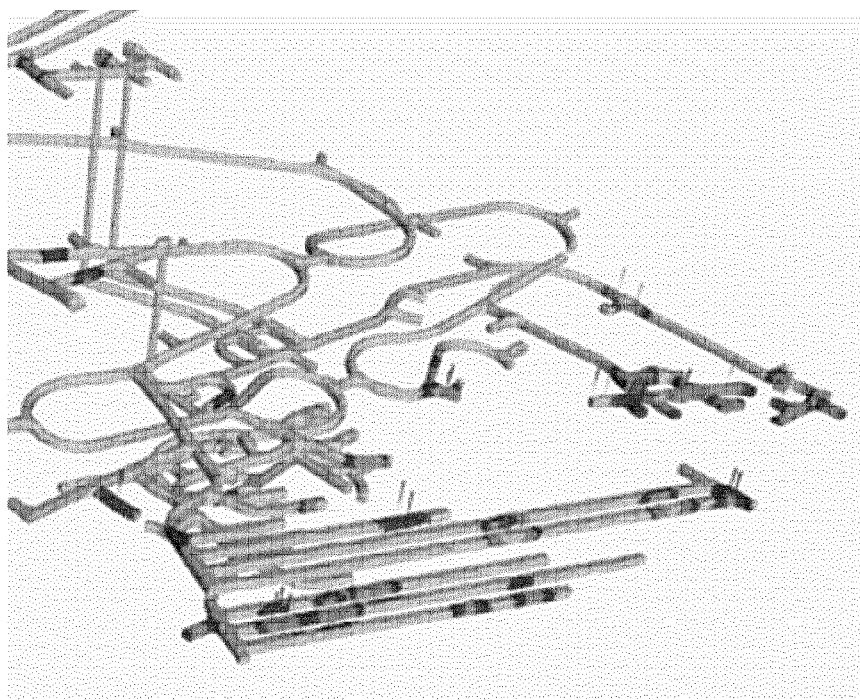
FIGS. 7a and 7b illustrate example display views.
Figure 7B:
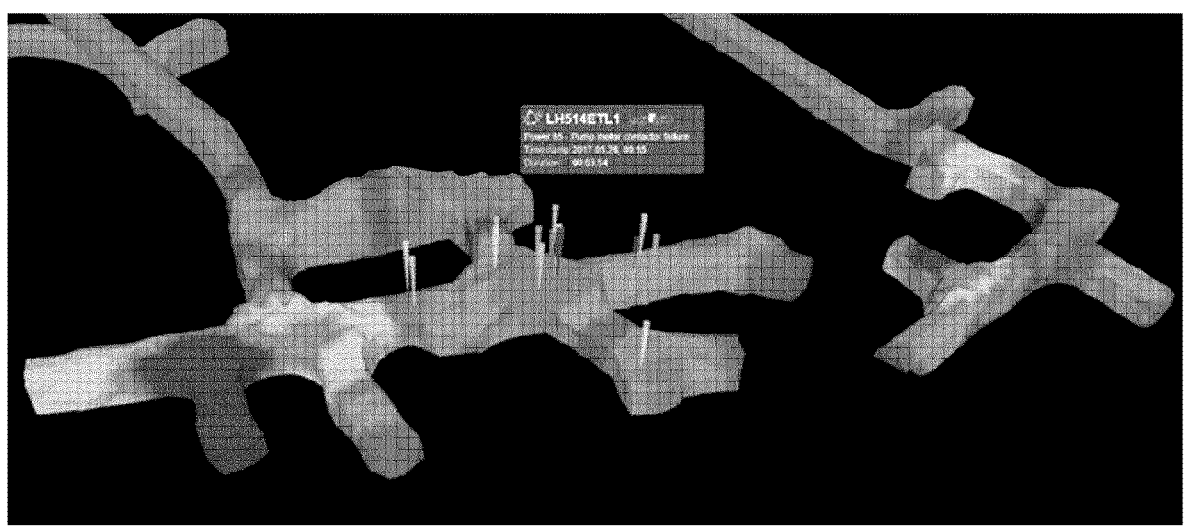

FIGS. 7a and 7b illustrated example views of 3D tunnel views of view portions. Different colors, or as in the examples, darker areas illustrate the affected areas in the tunnel system. Further information and/or indicators may be provided in the operator guidance element and/or in other view elements. For example, the poles in FIG. 7b may illustrate individual event and further information windows (one illustrated) comprising event information and/or guidance information may be displayed. Such further window may be displayed automatically or in response to user input for an associated event.

Event information based on processing in block 310 may be stored for later processing, such as for subsequent production efficiency or incident inspection analysis of the mine operations. In some embodiments, event status(es) may be reviewed at desired time instants or time ranges. The operator attention indicator, or other indicators based on density of events in affected location area(s) are updated according to event information at the respective time instants or ranges. The event information may be retrieved from the data storage 22 or generated for the review based on mine operations data the occurred production.

According to an embodiment, an indication of operator-selected time instant or time range is received. Time stamps of the events are processed to detect a set of events matching with the user-selected time instant or time range, and the operator attention indicator is then generated on the basis of the set of events. Thus, the time instant or range information may be input to block 310 and processing of the time stamps may be part of block 310.

It is to be appreciated that various further features may be complement or differentiate at least some of the above-illustrated embodiments. For example, there may be further user interaction and/or automation functionality further assisting the operator to control various mine devices and operations/settings thereof.

Figure 8:
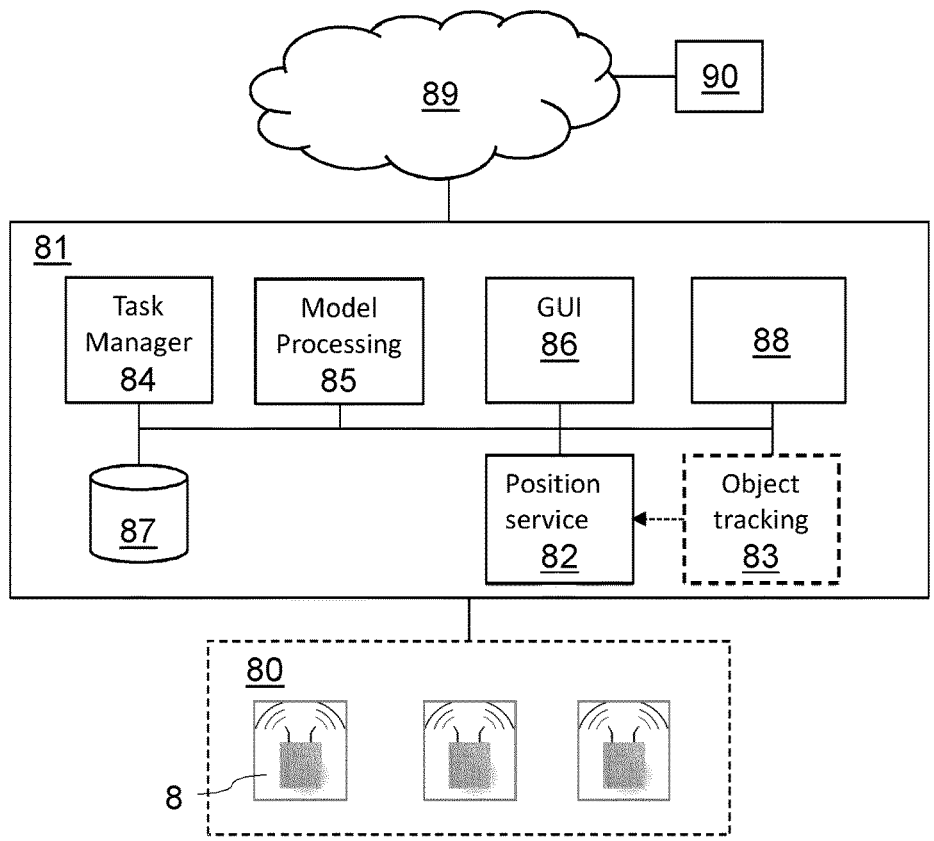
FIG. 8 illustrates an example system according to at least some embodiments.

FIG. 8 illustrates operational modules of a mine operations control apparatus or system, such as a server 81 according to some embodiments. An object tracking module 83 may be configured track location of mobile objects and to provide 3D position indicator to further modules, in some embodiments a position service module 82.

The server 81 may comprise a task manager or management module 84, which is configured to manage at least some operations at the worksite. For example, the task manager may be configured to assign work tasks for a fleet of work machines and update, send control signals to the work machines, and/or monitor work machine task performance and status, which is indicated at a task management graphical user interface (GUI).

The server 81 may comprise a model processing module 85, which may maintain one or more models of the underground worksite, such as the 3D mine model. In some embodiments, the model processing module 85 is configured to map the events to the mine model.

The server 81 may comprise a GUI module 86, which is configured to generate at least some display views for an operator (locally and/or remotely). In some embodiments, the GUI module 86 is configured to generate, on the basis of the 3D model or floor model, a 3D (and/or 2D) view comprising current positions of the mobile objects and the operator attention indicators by applying at least some of the above illustrated embodiments.

The server 81 may comprise further module(s) 88, such as a remote monitoring process and UI, an event processing module configured to process the mine operations data data to carry out least some functions illustrated above, and/or a cloud dispatcher component configured to provide selected worksite information, such as the mobile object position information to a cloud service.

The system and server 81 may be connected to a further system 90 and/or network 89, such a worksite management system, a cloud service, an intermediate communications network, such as the internet, etc. The system may further comprise or be connected to a further device or control unit, such as a handheld user unit, a vehicle unit, a worksite management device/system, a remote control and/or monitoring device/system, data analytics device/system, sensor system/device, etc.

The object tracking 83 may be implemented as part of another module, such as the position service module 82. The position service 82 is configured to provide, upon request or by push transmission, mobile object position information obtained from or generated on the basis of information from the object tracking 83 for relevant other modules or functions, such as the database 87, the visualizer graphical user interface 86, and/or remote units or systems 70 via one or more networks 89. In the example of FIG. 8 the modules are illustrated as inter-connected, but it is to be appreciated that not all modules need to be connectable.

The system may comprise or be connected to a control unit or module of a work machine or another mine operations device for which e.g. control commands may be transmitted. In an example embodiment, the control unit may be provided in each autonomously operating vehicle and be configured to control at least some autonomous operations of the vehicle on the basis of the received control commands.

An electronic device comprising electronic circuitries may be an apparatus for realizing at least some embodiments of the present invention, such as the method illustrated in connection with FIG. 3. The apparatus may be comprised in at least one computing device connected to or integrated into a mine control system.

Figure 9:
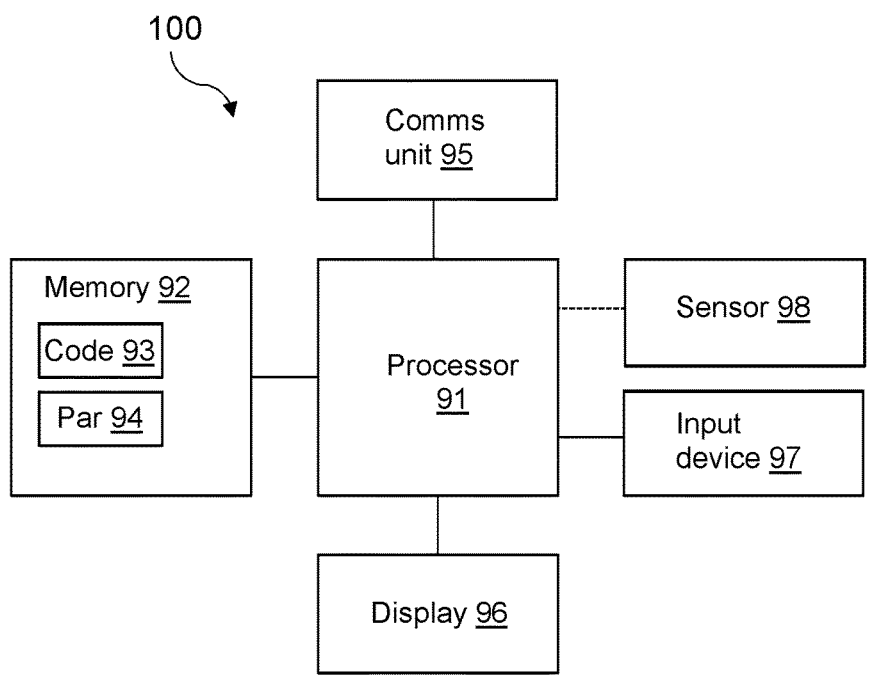
FIG. 9 illustrates an example apparatus capable of supporting at least some embodiments of the present invention.

FIG. 9 illustrates an example apparatus capable of supporting at least some embodiments of the present invention. Illustrated is a device 100, which may be configured to carry out at least some of the embodiments relating to the mine operations analytics and control illustrated above. In some embodiments, the device 100 comprises or implements the server 81 and/or the DPU 21.

Comprised in the device 100 is a processor 91, which may comprise, for example, a single- or multi-core processor. The processor 91 may comprise more than one processor. The processor may comprise at least one application-specific integrated circuit, ASIC. The processor may comprise at least one field-programmable gate array, FPGA. The processor may be configured, at least in part by computer instructions, to perform actions.

The device 100 may comprise memory 92. The memory may comprise random-access memory and/or permanent memory. The memory may be at least in part accessible to the processor 91. The memory may be at least in part comprised in the processor 91. The memory may be at least in part external to the device 100 but accessible to the device. The memory 92 may be means for storing information, such as parameters 94 affecting operations of the device. The parameter information in particular may comprise parameter information affecting e.g. the floor model generation and application, such as threshold values.

The memory 92 may comprise computer program code 93 including computer instructions that the processor 91 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The processor may, together with the memory and computer program code, form means for performing at least some of the above-illustrated method steps in the device.

The device 100 may comprise a communications unit 95 comprising a transmitter and/or a receiver. The transmitter and the receiver may be configured to transmit and receive, respectively, i.a. mine operations data and control commands in accordance with at least one cellular or non-cellular standard. The transmitter and/or receiver may be configured to operate in accordance with global system for mobile communication, GSM, wideband code division multiple access, WCDMA, long term evolution, LTE, 3GPP new radio access technology (N-RAT), wireless local area network, WLAN, Ethernet and/or worldwide interoperability for microwave access, WiMAX, standards, for example. The device 100 may comprise a near-field communication, NFC, transceiver. The NFC transceiver may support at least one NFC technology, such as NFC, Bluetooth, or similar technologies.

The device 100 may comprise or be connected to a UI. The UI may comprise at least one of a display 96, a speaker, an input device 97 such as a keyboard, a joystick, a touchscreen, and/or a microphone. The UI may be configured to display views on the basis of the worksite model(s) and the mobile object position indicators. A user may operate the device and control at least some features of a control system, such as the system illustrated in FIG. 6. In some embodiments, the user may control a vehicle 4-7 and/or the server via the UI, for example to change operation mode, change display views, modify parameters 94 in response to user authentication and adequate rights associated with the user, etc.

The device 100 may further comprise and/or be connected to further units, devices and systems, such as one or more sensor devices 98 sensing environment of the device 90. The sensor device may comprise an IMU or another type of sensor device configured to determine movements of a mobile object.

The processor 91, the memory 92, the communications unit 95 and the UI may be interconnected by electrical leads internal to the device 100 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

The present invention finds industrial application at least in mine operations control systems.

The invention claimed is:

1. An apparatus comprising at least one processor and at least one memory including computer program code, the at least one memory and the computer program code being configured to, with the at least one processor, cause the apparatus at least to:
   receive mine operations data from a set of data sources in a mine, the mine operations data comprising sensor data;
   process the mine operations data to detect mine operations data meeting at least one threshold value for generating, based on the mine operations data, events for a set of events meeting at least one operator attention triggering condition;
   map the set of events to a mine model on the basis of location information associated with the events in the set of events;
   determine an affected event location area for each event in the set of events, the affected event location areas defining an affected location area of the set of events mapped to the mine model;
   generate, on the basis of the set of events and the affected location area, an operator attention indicator dependent on density of events in the affected location area; and
   control display of the operator attention indicator for the set of events in the affected location area in the mine model to an operator to adjust operation of one or more mine operations devices.

2. The apparatus of claim 1, wherein the at least one memory and the computer program code are further configured to, with the at least one processor, cause the apparatus to:
   process at least some events in the set of events to define at least one associated operator guidance element to adjust the operation of the one or more mine operations devices; and
   control display of the at least one associated operator guidance element for the affected location area.

3. The apparatus of claim 1, wherein the at least one memory and the computer program code are further configured to, with the at least one processor, cause the apparatus to:
   cause a display of at least one operator guidance element associated with at least some of the events in the set of events in response to detecting an operator input for the affected location area or at least one event associated with the one or more mine operations devices.

4. The apparatus of claim 1, wherein the at least one memory and the computer program code are further configured to, with the at least one processor, cause the apparatus to:
   process at least some events in the set of events by a corrective action module to detect at least one corrective action to address at least some of events in the set of events;
   determine one or more mine operations devices and one or more control commands associated with the corrective action; and
   cause transmission of control signals associated with the one or more control commands to the determined one or more mine operations devices in response to detecting an imperative condition for automatic control; or
   generate an operator guidance element indicative of the determined one or more mine operations devices and the one or more control commands.

5. The apparatus of claim 1, wherein the at least one memory and the computer program code are further configured to, with the at least one processor, cause the apparatus to:
   process at least some events in the set of events to determine if at least one area alarm condition is met; and
   in response to detecting that the at least one area alarm condition is met, cause the area alarm and/or a safety control action associated with at least the affected area.

6. The apparatus of claim 1, wherein the mine operations data comprises sensor data from mobile work machines, and wherein the at least one memory and the computer program code are further configured to, with the at least one processor, cause the apparatus to:
   detect locations of mobile work machines;
   map the locations of mobile work machines to the mine model;
   display mobile work machine indicators in the mine model on the basis of the mapped locations;
   receive operator input for controlling operations of at least some of the mobile work machines after displaying the mobile work machine indicators and the operator attention indicator; and
   cause one or more control signals for the at least some of the mobile work machines on the basis of the operator input.

7. The apparatus of claim 1, wherein the at least one memory and the computer program code are further configured to, with the at least one processor, cause the apparatus to:
   map one or more events of the set of events to a location of a mobile work machine on the basis of work machine identification information received with mine operations data associated with the one or more events.

8. The apparatus of claim 1, wherein the at least one memory and the computer program code are further configured to, with the at least one processor, cause the apparatus to:

define at least one visualization parameter for the operator attention indicator in the affected location area on the basis of density of the set of data events and/or a set of parameter values of the set of events in the affected location area; and control display of the operator attention indicator on the basis of the defined at least one visualization parameter in a production status display based on the mine model.

9. The apparatus of claim 1, wherein the at least one memory and the computer program code are further configured to, with the at least one processor, cause the apparatus to:

control coloring of a model point on the basis of a first magnitude value within a first radius from a location of an event in the set of events and on the basis of a second magnitude value at a second radius from the location of the event, wherein the second radius is larger than the first radius and the first magnitude value is larger than the second magnitude value, and coloring is not applied for indicating operator attention in the affected location area outside the second radius.

10. The apparatus of claim 1, wherein the mine model includes three-dimensional point cloud data for three-dimensional representation of an underground mine, and the operator attention indicator covers at least a portion of a three-dimensional representation of a tunnel portion associated with the affected area.

11. An underground monitoring system, comprising:
one or more data processing devices;
one or more user interface devices;
one or more data storage devices;
one or more communications devices; and an apparatus according to claim 1.

12. A method comprising:
receiving mine operations data from a set of data sources in a mine, the mine operations data comprising sensor data,
processing the mine operations data to detect mine operations data meeting at least one threshold value for generating, on the basis of the mine operations data, events for a set of events meeting at least one operator attention triggering condition;
mapping the set of events to a mine model on the basis of location information associated with the events in the set of events;
determining an affected event location area for each event in the set of events, the affected event location areas defining an affected location area of the set of events mapped to the mine model,
generating, on the basis of the set of events and the affected location area, an operator attention indicator dependent on density of events in the affected location area; and
controlling display of the operator attention indicator for the set of events in the affected location area in the mine model to an operator to adjust operation of one or more mine operations devices.

13. The method of claim 12, further comprising:
processing at least some events in the set of events to detect at least one corrective action to address at least some of events in the set of events;
determining one or more mine operations devices and one or more control commands associated with the corrective action; and
causing transmission of control signals associated with the one or more control commands to the determined one or more mine operations devices in response to detecting an imperative condition for automatic control; or
generating an operator guidance element indicative of the determined one or more mine operations devices and the one or more control commands.

14. A non-transitory computer-readable medium comprising computer program code for, when executed in a data processing apparatus, causes an apparatus to perform the steps of:
receiving mine operations data from a set of data sources in a mine, the mine operations data including sensor data;
processing the mine operations data to detect mine operations data meeting at least one threshold value for generating, on the basis of the mine operations data, events for a set of events meeting at least one operator attention triggering condition;
mapping the set of events to a mine model on the basis of location information associated with the events in the set of events;
determining an affected event location area for each event in the set of events, the affected event location areas defining an affected location area of the set of events mapped to the mine model;
generating, on the basis of the set of events and the affected location area, an operator attention indicator dependent on density of events in the affected location area; and
controlling display of the operator attention indicator for the set of events in the affected location area in the mine model to an operator to adjust operation of one or more mine operations devices.

15. The non-transitory computer-readable medium according to claim 14, comprising computer program code to further cause the apparatus to perform the steps of:
processing at least some events in the set of events to define at least one associated operator guidance element to adjust the operation of the one or more mine operations devices; and
controlling display of the at least one associated operator guidance element for the affected location area.

* * * * *